April 14, 1959

R. H. HARWOOD ET AL 2,881,535

SONAR SIGNAL SIMULATOR

Filed Sept. 17, 1954

INVENTOR.
ROBERT H. HARWOOD
ZACK D. REYNOLDS
BY EARL G. HEDGER

George Sipkin
George E. Pearson
ATTORNEYS

April 14, 1959

R. H. HARWOOD ET AL 2,881,535

SONAR SIGNAL SIMULATOR

Filed Sept. 17, 1954

INVENTOR.
ROBERT H. HARWOOD
ZACK D. REYNOLDS
BY   EARL G. HEDGER

George Sipkin
George E. Pearson
ATTORNEYS

April 14, 1959

R. H. HARWOOD ET AL 2,881,535

SONAR SIGNAL SIMULATOR

Filed Sept. 17, 1954

INVENTOR.
ROBERT H. HARWOOD
ZACK D. REYNOLDS
EARL G. HEDGER
BY

ATTORNEYS

United States Patent Office 2,881,535
Patented Apr. 14, 1959

2,881,535

SONAR SIGNAL SIMULATOR

Robert H. Harwood, San Diego, Zack D. Reynolds, La Mesa, and Earl G. Hedger, San Diego, Calif., assignors to the United States of America as represented by the Secretary of the Navy Application September 17, 1954, Serial No. 456,891

17 Claims. (Cl. 35—10.4)

(Granted under Title 35, U. S. Code (1952), sec. 266)

The invention described herein may be manufactured and used by or for the Government of the United States of America for governmental purposes without the payment of any royalties thereon or therefor.

This invention relates to sonar signal simulators and more specifically to an electronic sonar signal simulator which provides for simulation of initial pulse, reverberations corresponding to various possible sea conditions, and Doppler-compensated single target echo as returned from craft maneuvering at any reasonable range and speed. Circuits are designed to allow all adjustable functions to be controlled by voltages from adjunct problem generators, when desired.

There is no previously known equipment that performs all of the functions of the present device. Some devices have been built which perform part of these functions as part of a training system, but they are too large and expensive for general training purposes. The only other method of obtaining the desired signals is to make actual recordings at sea. However, this method is inflexible and expensive, and does not permit control by the instructor.

The sonar signal simulator of the present invention provides a small, light-weight, compact, portable means of audible simulation of the reverberations and single-target echoes associated with sonar units and has a very wide range of control of these functions. For example, the device simulates the reverberations and echoes for most pulse lengths used in sonar. Manual controls have been provided with wide enough latitude of control of operation that almost any combination of sea conditions with resulting sonar pulse lengths can be simulated.

The fundamental information presented audibly from any sonar detector is composed of the initial pulse, reverberation, and echoes reflected from objects in the path of the transmitted energy. One composite assembly simulating this information would be a basic unit for any trainer utilizing audio presentation. The simulator of the present invention may be used as a single unit for classroom demonstration of sounds from underwater ranging devices. Poorest and best operating conditions to be expected may be compared. Training may be given in the detection of the Doppler effect of moving targets. Adjunct problem generators may be used to automatically change the presentation according to different tactical conditions. Also, complete tactical maneuvers may be simulated and recorded on tactical range recorders.

It is therefore an object of this invention to provide for small compact means for the simulation of audible reverberations and single-target echoes associated with sonar training units.

Another object is the provision of a universal sonar signal simulator which will simulate reverberations and echoes for all pulse lengths.

Another object is the provision of a ready means of control of apparent sea and target tactical conditions for sonar operator training purposes.

Another object is the provision of a sonar signal simulator which may be used by sonar trainers representative of new and varied types of shipboard installations.

Other objects and many of the attendant advantages of this invention will be readily appreciated as the same becomes better understood by reference to the following detailed description when considered in connection with the accompanying drawings wherein:

Figs. 4 to 13 show circuit diagrams for the following units:

Figure 3A:
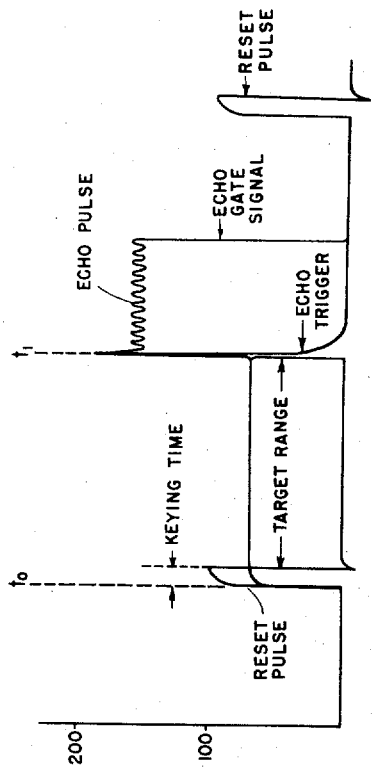
Fig. 3A is a pulse diagram illustrating the derivation of the echo pulse from the reset pulse and the time relationship therebetween.
Figure 3B:
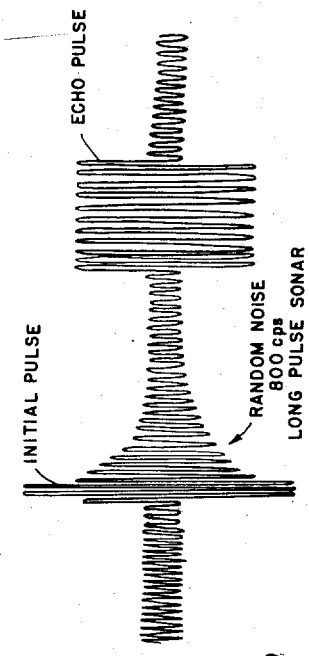
Fig. 3B is a pulse diagram illustrating the random noise simulation of a suppressed high-amplitude long initial pulse followed by exponentially decaying reverberations corresponding to increasing range of sound travel.
Figure 3C:
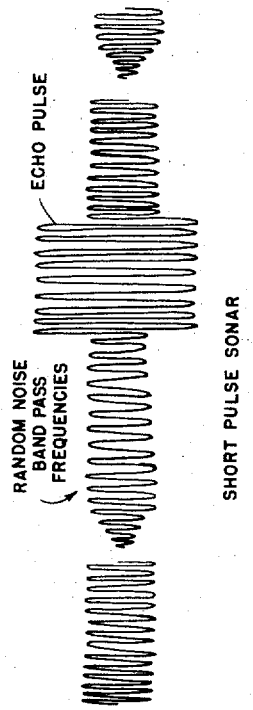
Fig. 3C is a pulse diagram illustrating the random noise simulation of a high power short-pulse and reverberation produced thereby.
Figure 1:
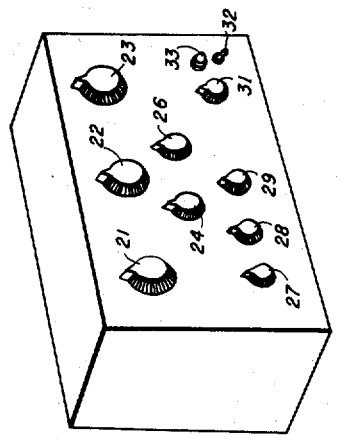
Fig. 1 shows the front panel and control knobs used by the instructor in simulation of apparent sea and target tactical conditions.
Figure 4:
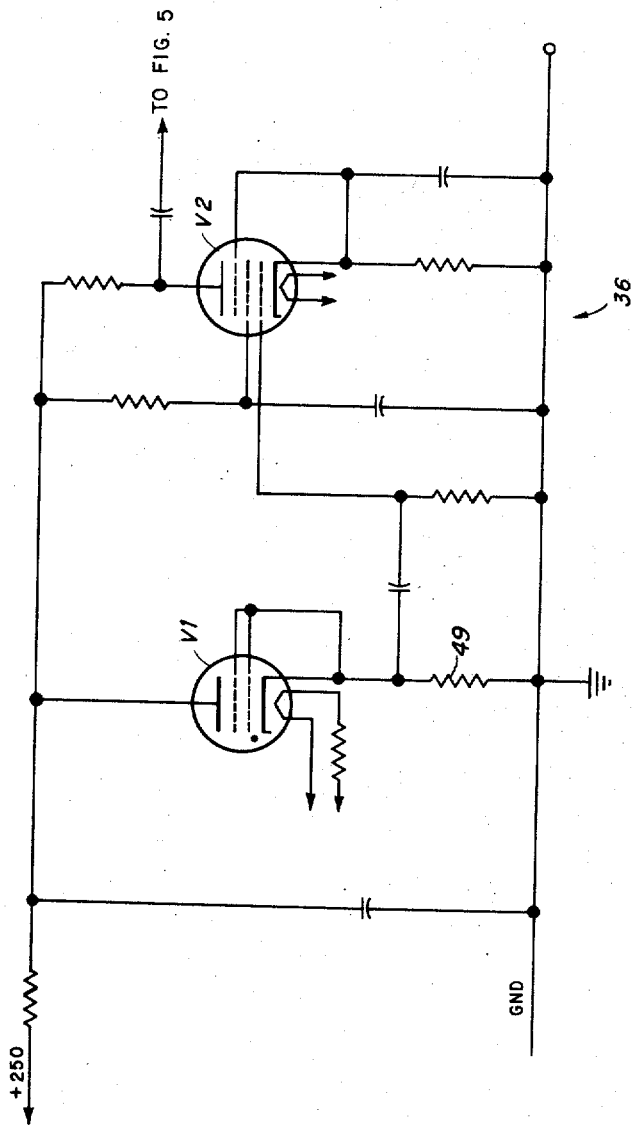
Figure 5:
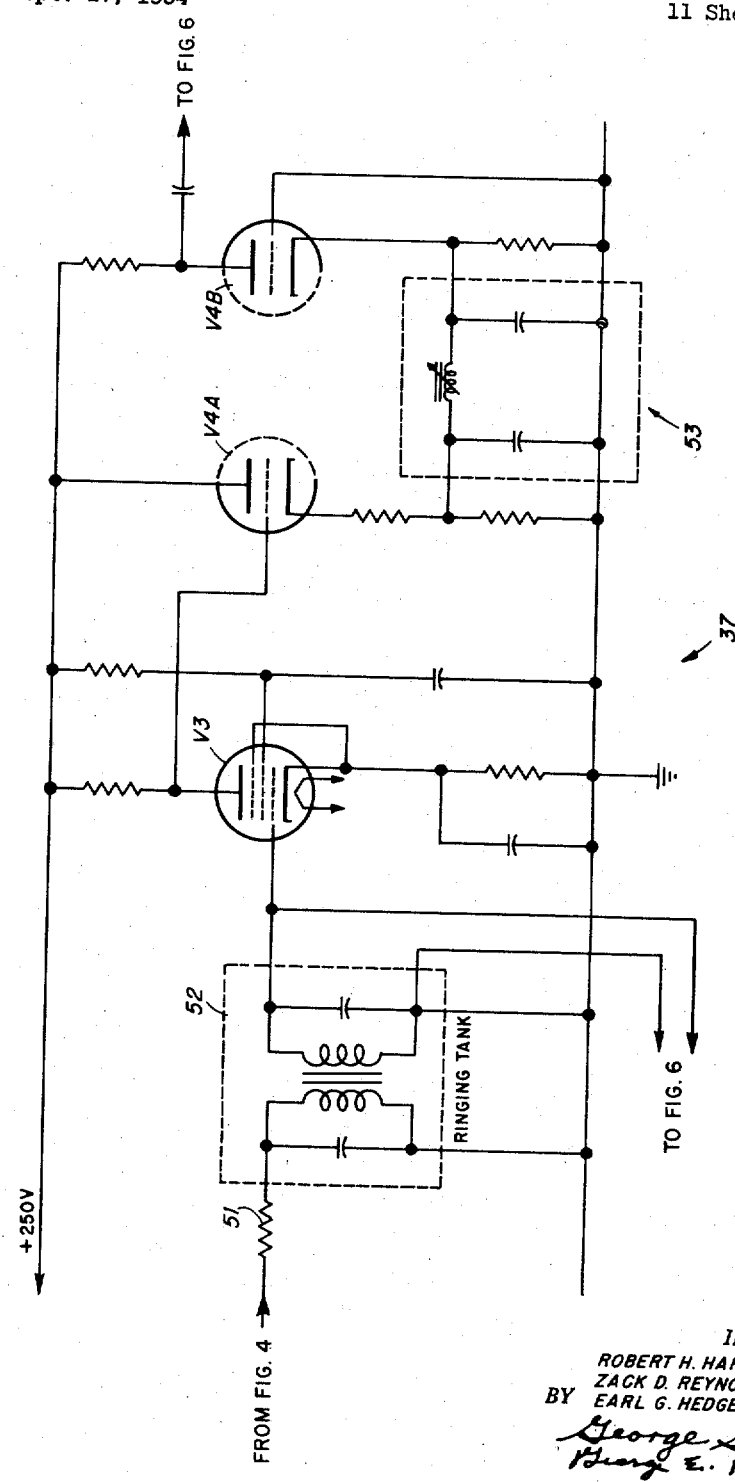
Figure 6:
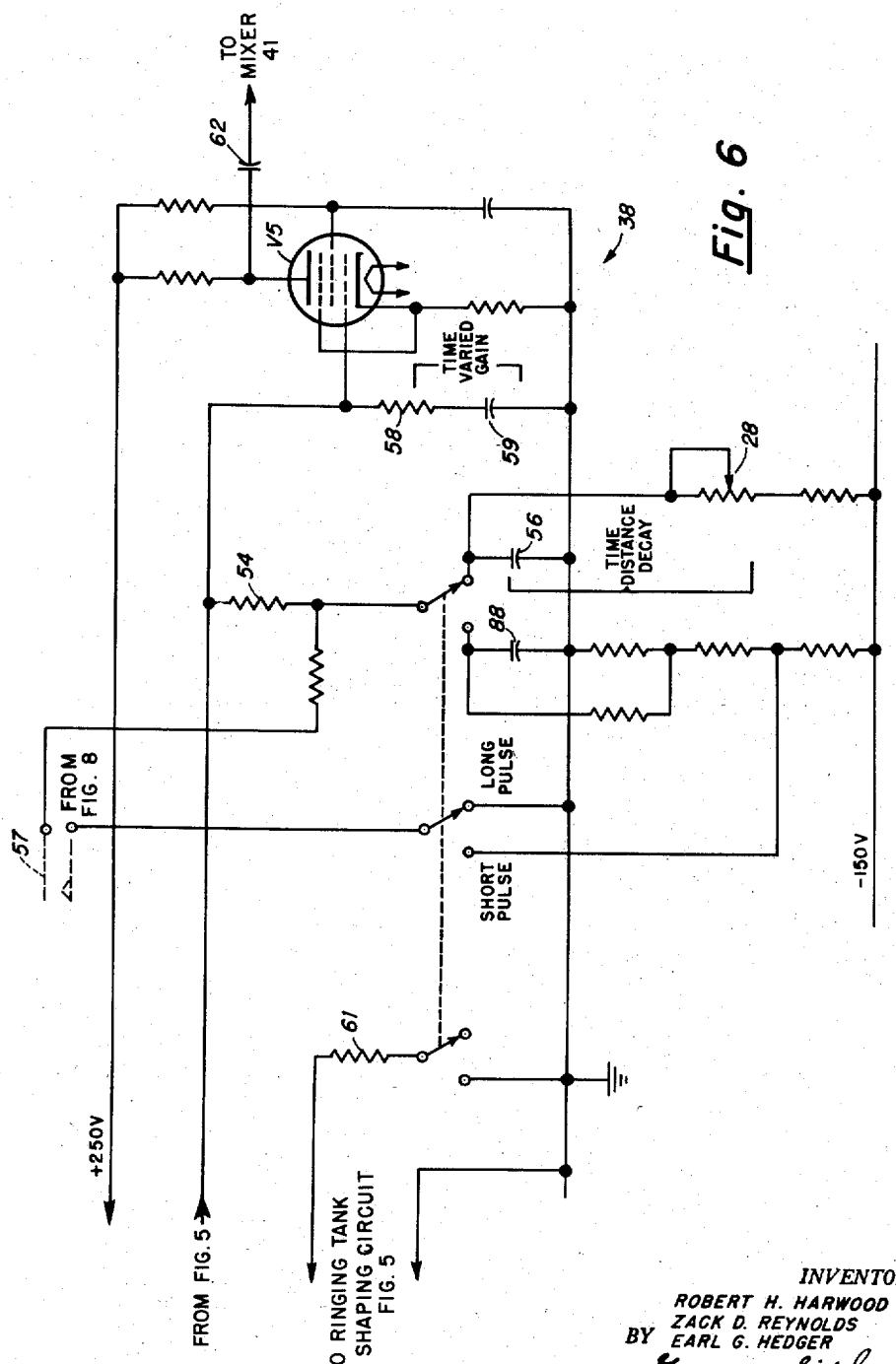
Figure 7:
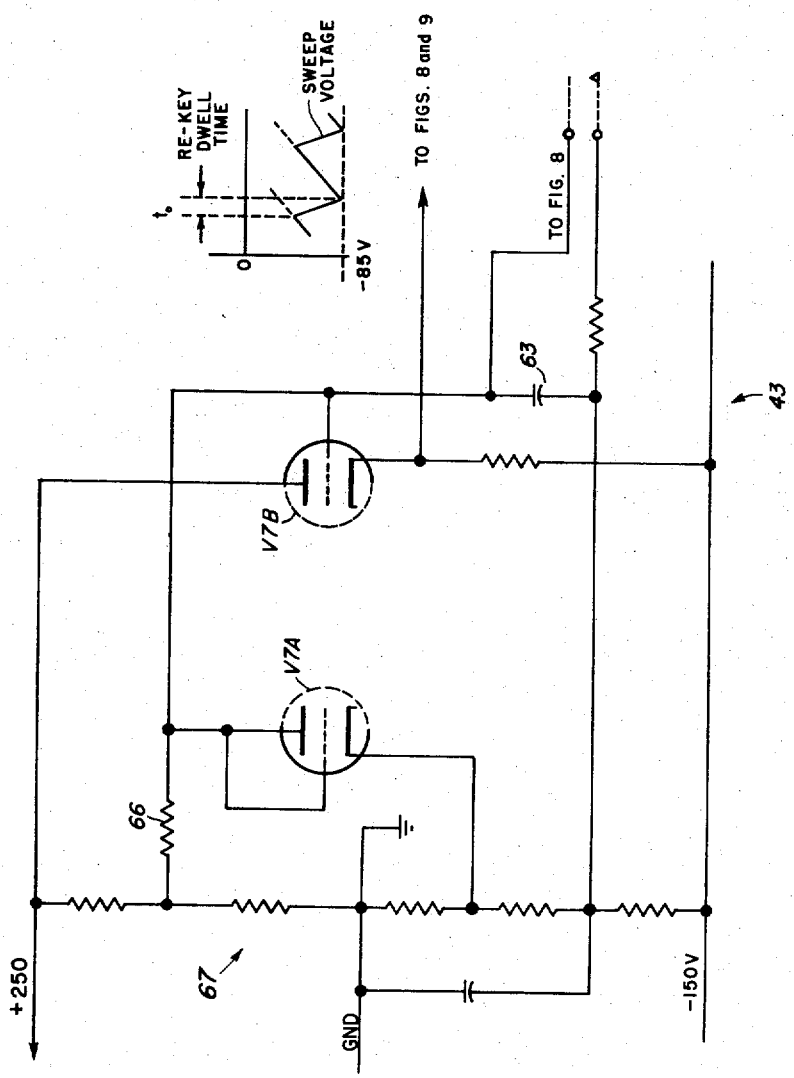
Figure 8:
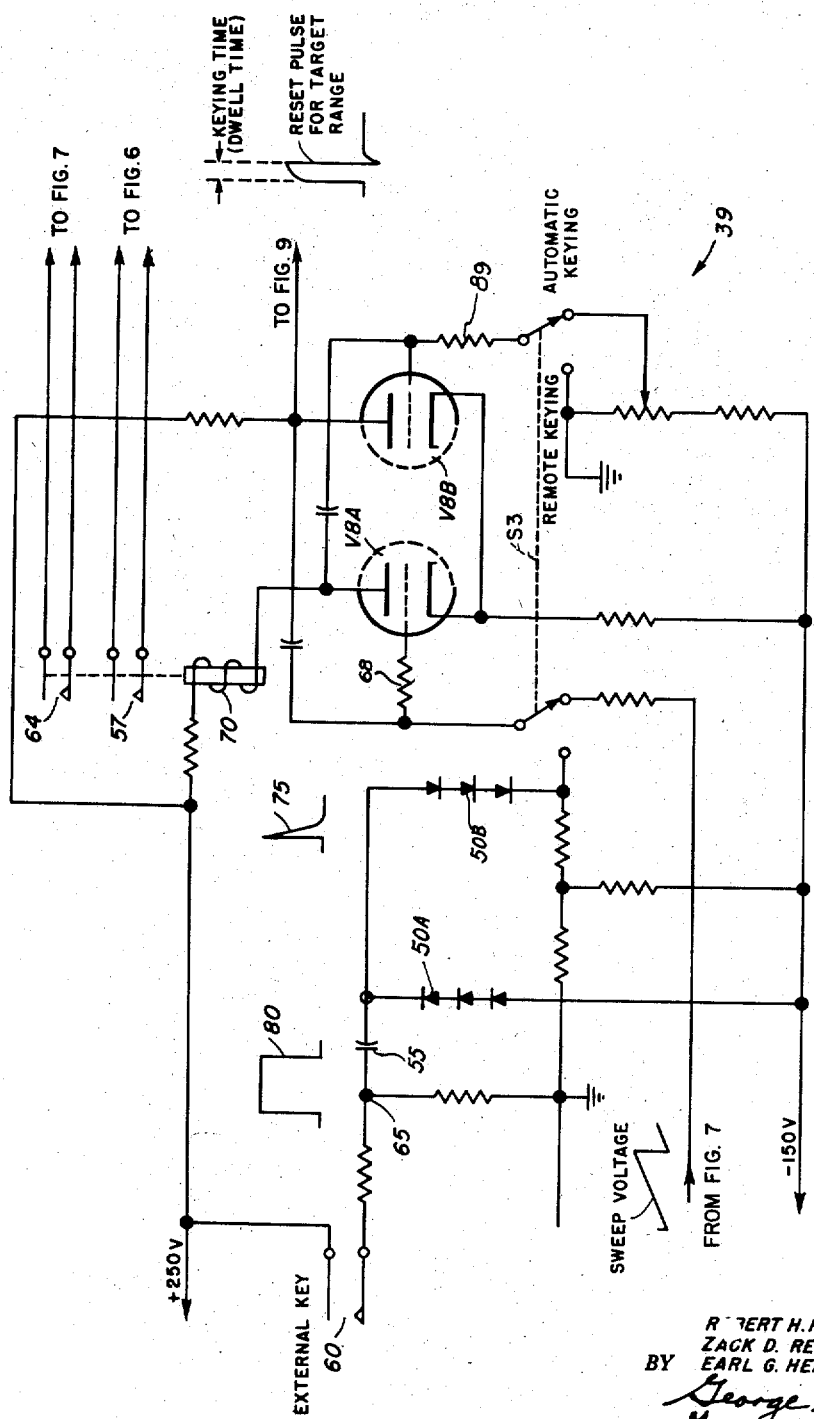
Figure 9:
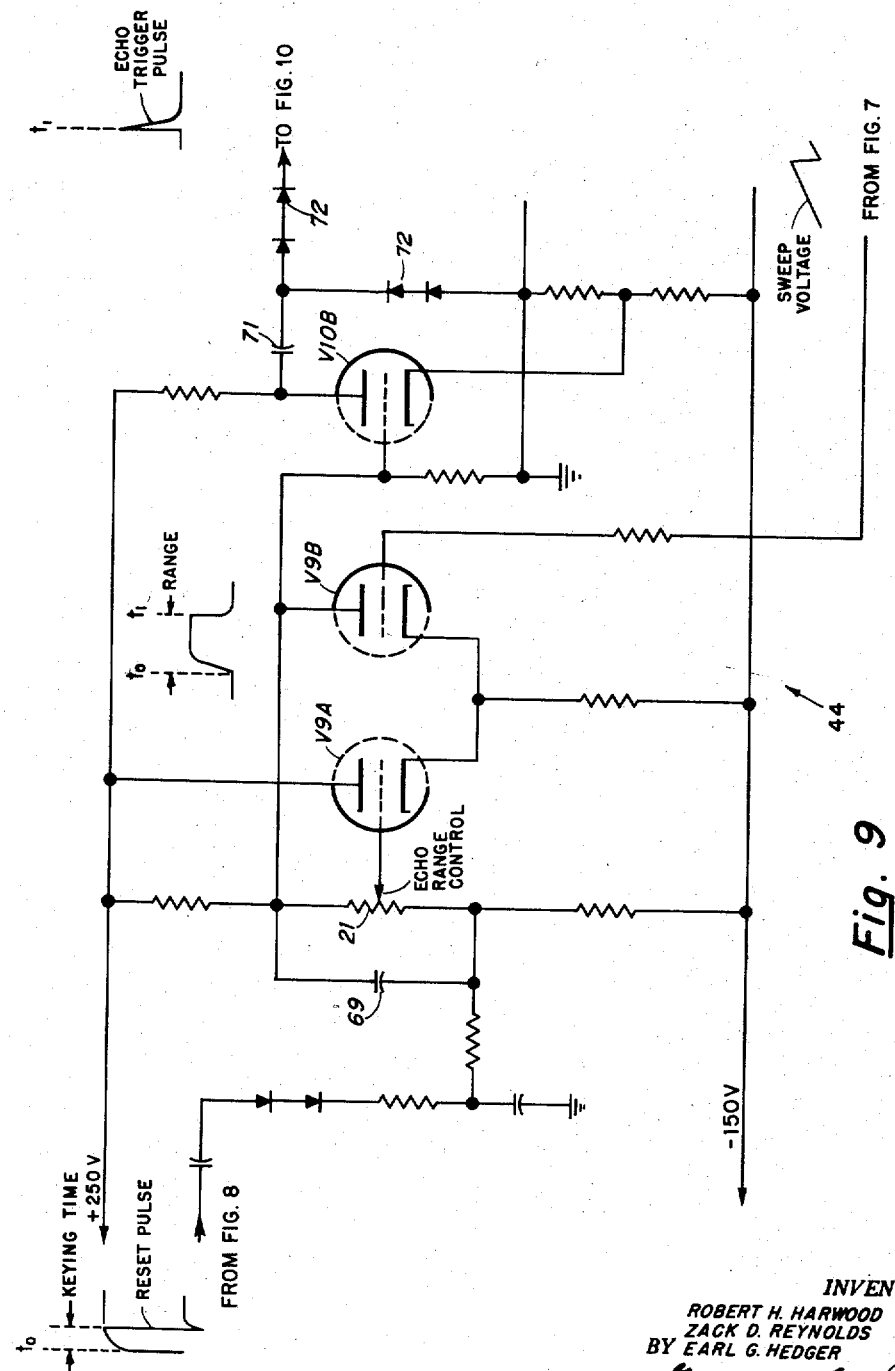
Figure 10:
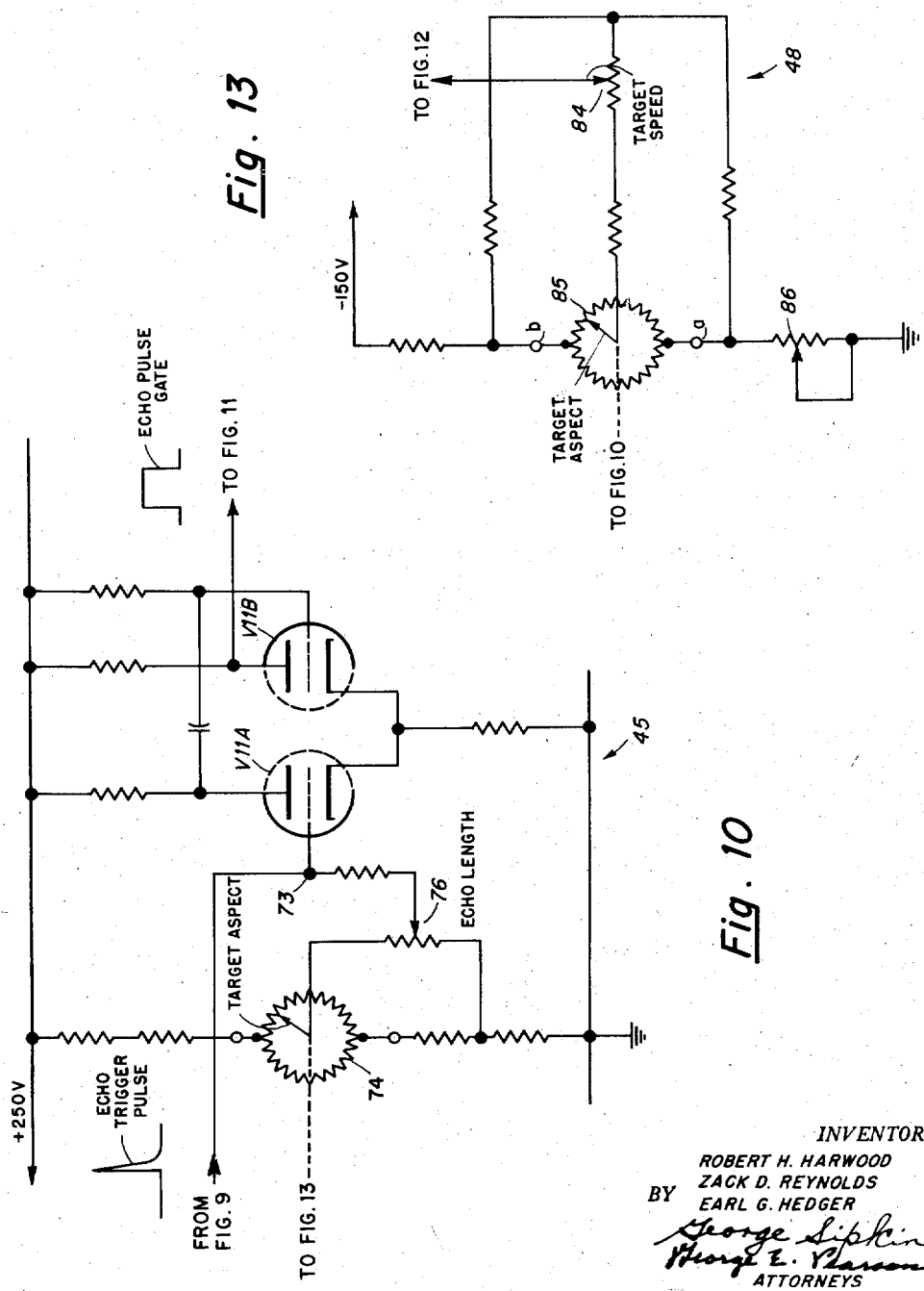
Figure 11:
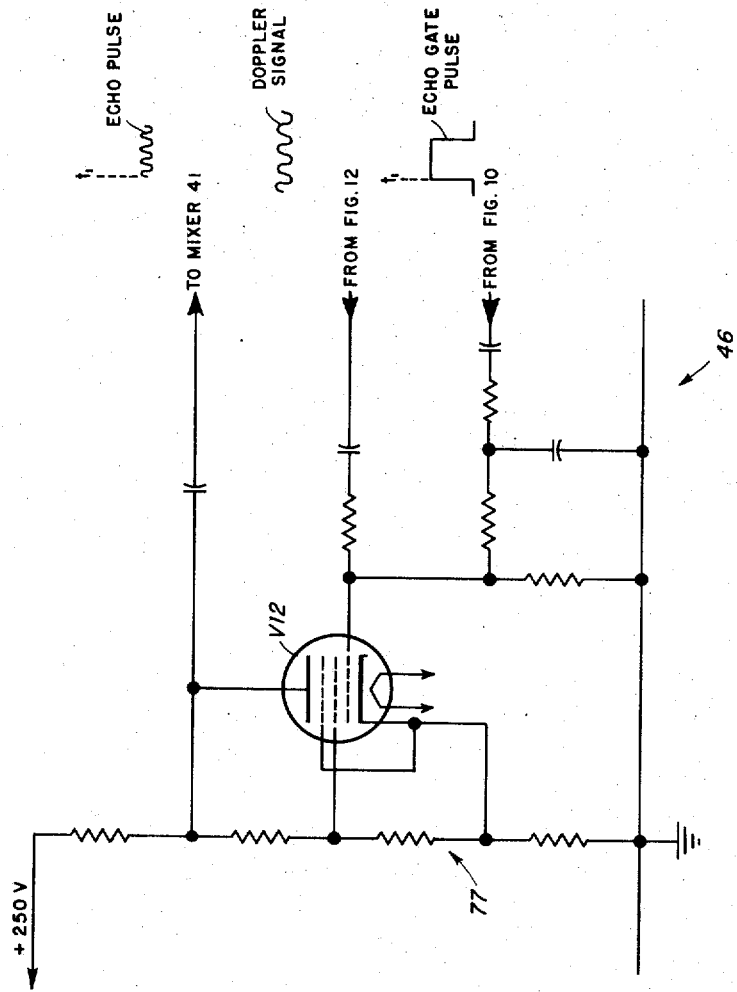
Figure 12:
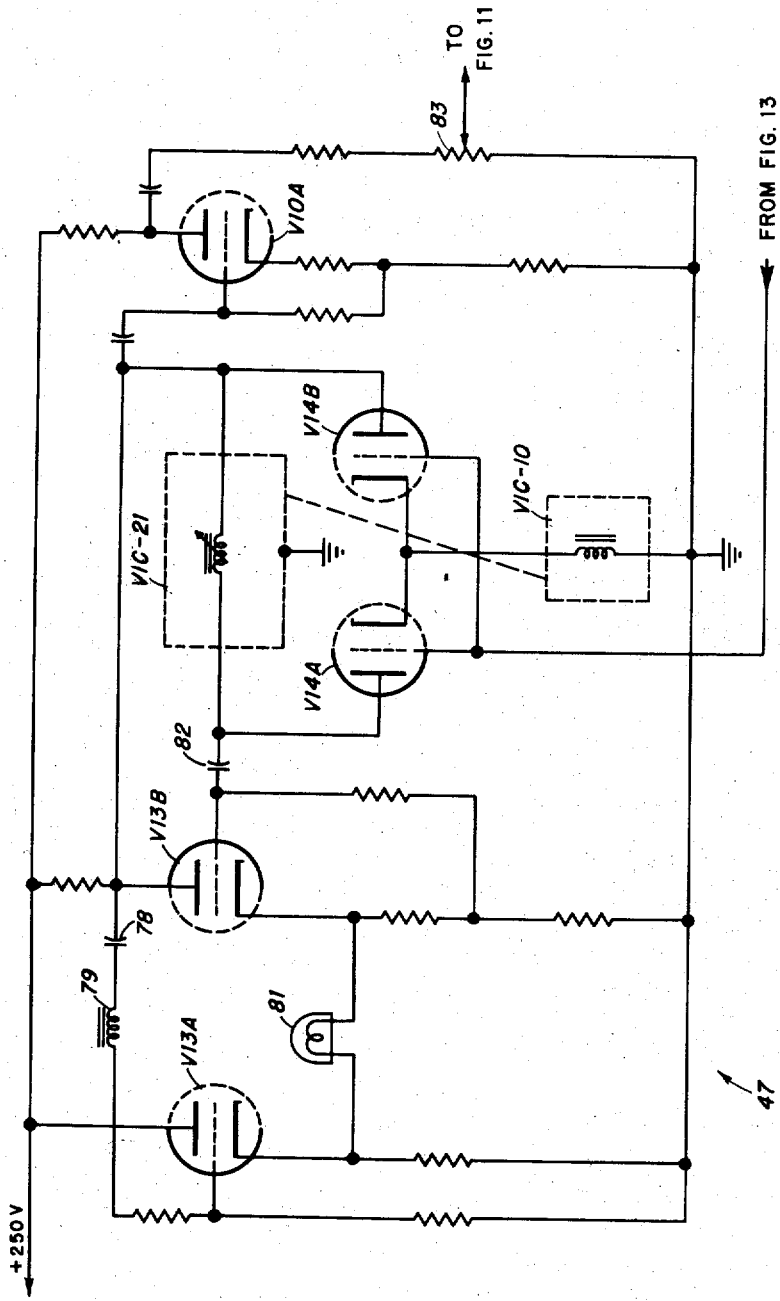

Fig. 4, high-level random-noise source;
Fig. 5, audio reverberation "shaping" circuit;
Fig. 6, time-varied gain, reverberation-amplitude decay simulating circuit;
Fig. 7, cathode-coupled sweep circuit;
Fig. 8, flyback circuit;
Fig. 9, echo range control circuit;
Fig. 10, adjustable-length-echo circuit;
Fig. 11, echo gate circuit;
Fig. 12, Doppler oscillator; and
Fig. 13, Doppler computer Referring now to the drawings in which reference characters designate like or corresponding parts throughout the several views, there is shown in Fig. 1 a pictorial view of the apparatus as viewed by the training instructor.

Three rows of controls are placed on the front panel to facilitate simulation of any reasonable tactical condition. From left to right on the top row are the "Target Range," "Target Aspect," and "Target Speed" controls 21, 22, and 23, used to determine the distinguishing characteristics of the target echo. The "Target Aspect" and "Target Speed" controls affect the frequency and duration of the simulated echo. The second, and center, row of controls are "Echo Length" 24 on the left and "Echo Amplitude" 26 on the right. The "Echo Length" control 24 represents the minimum length of echo duration for beam target. For other target aspects, the echo length is increased. The "Echo Amplitude" 26 control is used to adjust the intensity of the echo relative to the initial reverberations. There are five controls along the bottom row. To the left is a two-position reverberation selector switch 27 used to change the reverberation characteristics distinguishing long, or common, pulsed sonar, with initial pulses of greater than 50 millisecond duration from the short-pulsed sonar which has very short high-power initial energy pulses, generally less than 50 milliseconds in duration. The effects of different basic methods of audio presentation for the two different sonar types are also compensated for by this switch. To the right of the reverberation-selector switch 27 are the "Reverberation Decay," "Volume," and "Flyback Rate" controls, 28, 29, and 31, and the toggle power switch 32 with associated red indicator lamp 33. The "reverberation Decay" control 28 effects the apparent damping rate of the reverberations for long-pulse sonar simulation, (It has no effect on the short-pulse simulation.) The "Flyback Rate" control 31 is used for automatic operation when the unit is used for demonstration purposes and determines the rate of re-key or flyback. A speaker, not shown in Fig. 1, is mounted on the rear of the chassis to save front panel space for controls. Also at the rear of the chassis is a terminal strip to allow for connecting external indicators, speakers or recorders, a toggle switch (31 in Fig. 2) to select either automatic or remote control of the flyback rate, and the input power cord with an associated fuse holder. The chassis cover has louvered vents over the speaker and on the sides to provide air circulation throughout the unit.

*General electrical characteristics*

Figure 2:
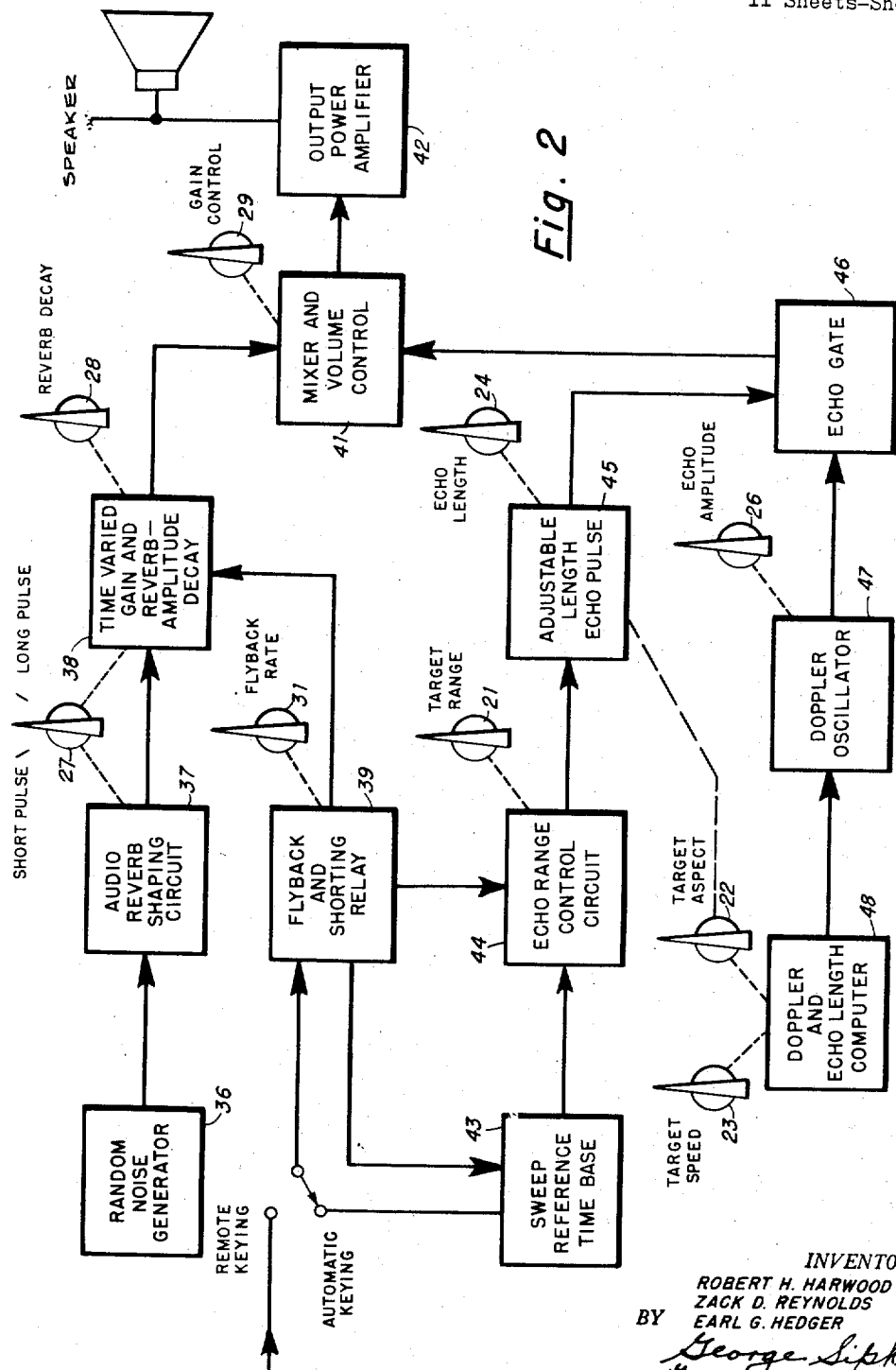
Fig. 2 shows a general block and flow diagram of the simulator.

The general characteristics of the electrical circuits can best be coordinated with reference to Fig. 2, the general block and flow diagram. The basic circuits are arranged in three rows. Along the top row are the circuits affecting the characteristics of the reverberations. A high level random-noise source 36, shown at the extreme left, is fed into an audio reverberation shaping circuit 37 composed of resonated high Q "ringing coils" and tuned bandpass circuits best shown in Fig. 5, which limit the output to a frequency of almost exactly 800 c.p.s. at large random variations in amplitude. This is a very realistic simulation of the frequency characteristics of reverberations from actual sea conditions of the standard, or long-pulse, sonar.

The "shaped" reverberations are then directed to an amplitude control stage 38 where simulated time-varied gain and amplitude-vs.-time decay is accomplished. When this stage is "keyed" by a momentary relay contact in the flyback circuit 39, the output reverberations give the audible impression of a suppressed high-amplitude initial pulse followed by exponentially decaying reverberations corresponding to increasing range of sound travel.

For short-pulse simulation, the effective Q's of the "ringing coils" are reduced to allow a wider band of random noise to pass. The time varied gain and reverberation decay circuit 38 is modified to suppress all output at key time, then allow the reverberations to exponentially rise to a relatively constant amplitude in a short time. (The amplitude of the short-pulse, high-amplitude sonar reverberations do not appear to materially diminish within any time corresponding to the maximum range of the unit.)

The controlled reverberations are then impressed across the volume control 41 of the output power amplifier stage 42 where they are mixed with any echo pulses, if they exist. The output of the power amplifier 42 is a limited-range transformer, 200 to 3500 c.p.s. with taps for 4-ohm voice coils and 600-ohm lines (not shown).

All ranging for the simulator is accomplished by comparing a voltage reference with an increasing voltage or sweep that is extremely linear with respect to time. At key time, the sweep 43 is reset to a constant negative value. For automatic operation, this sweep voltage, which increases in a positive direction, is applied to the echo range control circuit 44 and the flyback circuit 39. When this voltage reaches a critical magnitude, as determined by the "Target Range" control 21, a bistable multivibrator in the echo range control circuit 44 is triggered. Its output is a sharp pulse which is accurately located in time from the start of the sweep by an amount corresponding to the desired range of the echo pulse.

The sweep continues to increase until it reaches a critical voltage in the flyback circuit 39 which is determined by the "Flyback Rate" potentiometer shown in Fig. 8. A multivibrator is triggered which closes a plate relay, with double-pole contacts, for a few milliseconds "dwell" time. During this time, the sweep is returned to its initial value, a reset pulse is provided for the echo range circuit 44 to change its condition of stability, and the initial pulse is provided for the time varied gain and reverberation decay circuit 38. Thus, the recurrent key rate or flyback rate is determined by the "Flyback Rate" setting 31. If the unit is remotely operated, the flyback multivibrator is triggered from a shaped pulse originating from an external range recorder, problem generator, etc. Under these conditions, the sweep will continue to rise until another re-key pulse is received, or until it reaches approximately zero volts. This point is limited by a protective bias arrangement. The maximum rise time of the sweep voltage is over seven (7) seconds, which allows a maximum echo range of approximately 5000 yards.

At the time corresponding to the range of the target echo, a sharp trigger voltage is supplied to an echo length multivibrator in the adjustable length echo pulse circuit 45 from the echo range circuit 44. The output of this multivibrator is a square wave whose length is determined by a preset bias voltage on the grid of one of the tubes. This positive square wave is applied to the control grid of the echo gate tube in the echo gate circuit 46 along with a constant frequency sine wave. This signal appears on the output for a time duration corresponding to the required echo length and delayed from the sweep start by a time corresponding to the echo range.

The suppressor electrode of the echo gate tube may be used to gate the echo according to an assumed training of the hydrophone if desired for some future combination.

The echo frequency is the output of a hybrid resistance-inductance Doppler oscillator 47. The dynamic plate resistances of the two sections of a dual triode are used as the frequency-determining resistors. The resistances are then a function of an applied D.-C. bias to the triode. By this means, the oscillator frequency can be adjusted from approximately 300 c.p.s. to 1300 c.p.s. corresponding to the Doppler effect of a moving target. The Doppler effect now available by this means simulates that produced by a maximum target speed of over 30 knots.

An arrangement of sine- and linear- potentiometers provide a Doppler and echo-length computer 48. The sine potentiometers provide voltages to the echo-length and the Doppler oscillator circuits 45 and 47 so their outputs will vary as the target aspect changes, i.e.: for echo length, $$T = K_t \cos \alpha + r$$

where $T$ = echo duration (never less than $r$)
$K_t$ = constant determined by target size and shape
$r$ = transmitted pulse length
$\alpha$ = target angle between target heading and target bearing angle and for echo frequency, $$f_e = f_o + K_f S_t \cos \alpha$$

where $f_e$ = observed beat echo frequency
$f_o$ = audible beat transmitted frequency
$K_f$ = approximate constant determined by actual ultrasonic transmitted frequency and local oscillator frequency. (approx. 17 for target speed in knots when transmission is 25 kc.)
$S_t$ = actual speed of target, since Doppler effect of own ships speed is generally compensated for.

Each basic adjustable circuit is voltage sensitive and may be controlled by the proper application of voltage information from remote problem generators.

*Specific electrical circuits*

The high-level random-noise source is shown in Fig. 4. A miniature thyratron, V1, is operated with reduced filament voltage to increase the low-frequency component of noise developed because of spurious emission and ionic collision within the gaseous atmosphere. It was found that noise output increased with average tube current, but that a current of 5 ma. provided sufficient output, consistent with limited total current drain on the power supply and dependable operation with various stock tubes chosen at random. The noise output is coupled from the cathode current-limiting resistor 49 of the tube to the grid of a V2 pentode operating under near "starved" conditions, i.e., the screen and plate voltages and cathode current have been reduced to the extent that the amplification factor and the plate resistance have materially increased with a corresponding decrease in mutual conductance. By this means, greater stage gain was accomplished for the small-amplitude noise voltages, in the lower frequencies, while many of the unwanted higher "hiss" frequencies are discriminated against. Because of the low-level signals and the high gain of this circuit, it has to be decoupled from any variations in the D.-C. supply, to prevent ringing or spurious oscillations.

This amplified noise is impressed across a series arrangement of resistor 51 and high-Q double-tuned "ringing tank" 52, shown in Fig. 5. This tank is sharply tuned to a center frequency of 800 c.p.s. so that the voltage across it is very nearly mono-frequency with varying amplitude due to random noise pulses from the preceding stage 36. The voltage is amplified by V3 and directly coupled to a cathode follower input to an 800 cycle band-pass filter 53. The output of the filter is matched to the cathode impedance of the grounded grid amplifier V4B. This circuit further diminishes the extremely high and low frequencies, providing an output which very closely matches the frequency characteristics and randomness of actual sea reverberations. The circuit including tubes V4A and V4B and filter 53 comprises the subject matter disclosed in the co-pending application of R. H. Harwood for Method and System of Impedance Matching, Serial No. 354,437, filed May 11, 1953.

These reverberations are amplitude controlled by the time-varied gain, reverberation-amplitude decay simulating circuit 38, Fig. 6. The signal is impressed on the grid of a remote-control pentode V5, along with a negative bias which varies with time. With switch 27 in long pulse position, the grid resistor 54 is connected to a 2 mfd. capacitor 56 which, at key time, is momentarily returned to ground by a relay contact 57 from the flyback circuit 39. Resistor 58 in series with a 0.002 mfd. capacitor 59 is also connected from the grid to ground. This allows the stage gain to rapidly increase to maximum, but subdues the sudden high-level output at key time, and corresponds to the audible time-varied-gain effect in sonar equipment.

When the relay contact 57 opens, the capacitor 56 exponentially rises to a more negative potential, approaching the —150 v. supply voltage. This results in gradually decreasing gain for the stage, which simulates time-distance decay. The rate of decay depends on the setting of the 2.5 meg. "Reverberation Decay" control 28 in series with the 2 mfd. capacitor 56.

When switch 27 is in short pulse position, the secondary of the ringing tank 52 of Fig. 5 is shunted by a 12K resistor 61, lowering its Q and allowing more noise frequencies in the reverberations.

The grid of V5 is returned to a charging circuit including condenser 88 of shorter time constant. At key time, the grid is momentarily biased highly negative, reducing the output reverberations to zero. After the "dwell" time, the average grid voltage rises in a short time to approximately —28 volts, keeping a constant amplitude of modified reverberations until the next key-time cycle.

The output of the decay stage is coupled through a 500 mmf. capacitor 62 to the volume control potentiometer of a conventional output power stage 42. This is a single-ended power stage driving a limited-range output transformer (200 to 3500 c.p.s.), for more accurate sound simulation of the audible output of shipboard equipment. A 4-ohm impedance tap on the output transformer is used to drive a 6" P.M. speaker, and a 600-ohm tap is connected to a terminal strip to allow external indicators, transducers, or recorders to be used. Since this stage is of conventional design, it is not shown in detail. It is thought that the block diagram 42 in Fig. 2 is sufficient.

The reference time base for the unit is a sweep voltage produced by the cathode-coupled sweep circuit, Fig. 7. At key time, the sweep capacitor 63, 4 mfd., is discharged by one contact pair 64 of the flyback relay, Fig. 8. During the "dwell time" of the contacts 64, the capacitor voltage rapidly approaches zero while the grid potential of V7B and the plate of V7A assume a potential of approximately —90 volts with respect to ground. After the relay contacts 64 open, the sweep capacitor 63 tends to charge through 3.3 meg-ohms resistor 66 to a positive 98 volts as determined by a tap on the voltage divider 67. This nearly linear rise of sweep voltage is limited only by the closing of the flyback relay for a re-key cycle, or by conduction of the clamping diode V7A, which is biased to —1.7 volts. The sweep voltage also appears on the cathode of V7B and is coupled from there to the range and flyback circuits 44 and 39.

The flyback circuit is shown in Fig. 8. Its function is to determine the rate of re-key for automatic operation, to establish the dwell time of the relay contacts 57 and 64 to the reverberation decay and sweep circuits, and to provide a reset pulse for the echo range circuit 44, which will be discussed hereafter. The switch S3 is shown in the position of automatic-or self-keying.

Ordinarily, and until key-time, the right hand tube, V8B is conducting and V8A is cut off from the cathode bias. This bias is varied for different flyback rates by changing the voltage on the grid on V8B with the "Flyback Rate" control 31. The sweep voltage is applied to the grid of V8A through a 100K isolation resistor 68 and rises from —85 volts toward zero volts. When the sweep has risen to the critical potential at which V8A begins to conduct, conditions for stability in the circuit are shifted and V8A conducts heavily, energizing the flyback relay 70, while V8B is cut off. The sweep returns to a highly negative value and this condition remains until the grid-cathode voltage of V8A has risen to the cut-off potential. The dwell time determined by means of this multivibrator is on the order of 30 ms. in duration. A positive pulse of this length is coupled from the plate of V8B to the echo range circuit 44.

For remote operation, the sweep voltage is disconnected from the grid of V8A and the grid resistor 89 of V8B is returned to ground so the stage would not automatically re-key. The remote keying pulse 75 is derived from a square pulse 80 which appears at point 65 in the voltage divider network including remotely controlled contacts 60, as the contacts are closed. Pulse 75 is differentiated by the RC circuit including condenser 55 and is clipped by rectifiers 50A and 50B before being applied to the circuit so its duration would not affect the dwell time of the flyback relay. One range sweep is generated for each input re-key pulse.

The echo range control circuit 44, Fig. 9, has a similar operation to that of the flyback circuit 39. The tubes V9A and V9B compose the pulse-forming circuit and V10B is an output buffer and amplifier. At key-time, a reset pulse from the flyback circuit 39 causes V9A to conduct and V9B is cut off by the high cathode bias. After the stage has been reset, the cathode assumes a potential approximating that of the grid of V9A since this tube is functioning as a cathode follower. The cathode potential is thus set by changing the "Target Range" potentiometer control 21. The sweep voltage from sweep circuit 43 is applied to the grid of V9B, and, as this voltage rises to such a value that the tube will conduct at a time corresponding to the desired echo range, the circuit reverts to the other stable condition where V9A is cut off and V9B conducts rather heavily. Since the common impedances and feedback between these two tubes is basically conductive, there are no RC charge or discharge paths, and the circuit will remain in this condition of stability until it is reset by the flyback circuit 39. A 0.25 mfd. capacitor 69 across the range control potentiometer 21 provides dependable operation for the extreme limits of range. Thus, at target-range time, the grid voltage of V10B is dropped to a highly negative value and the plate voltage rapidly rises to B+. The plate voltage change of this tube is then relatively independent of the grid voltage change as long as the cathode current is cut off. The rapidly rising voltage of V10B is coupled through a 0.001 mfd. capacitor 71 and a clipping arrangement of germanium diodes 72, to the input of the echo-length multivibrator circuit 45 which has an input impedance approximating 200K ohms.

At target-range time, this sharp positive pulse of approximately 1 ms. duration is applied as a trigger voltage to the adjustable-length-echo circuit 45, Fig. 10. This voltage causes V11A to conduct rather heavily, and cuts off V11B by raising the cathode bias and by R-C coupling between the plate of V11A and the grid of V11B. The cathode potential is then a function of the grid voltage at point 73. This circuit condition is maintained until the grid voltage of V11B exponentially rises and returns to the cut-off grid-cathode voltage of the tube. The circuit equilibrium conditions rapidly shift until V11A is cut off and V11B is conducting again. The output voltage on the plate of V11B is then a positive square wave as shown in Fig. 10. The duration of this pulse is controlled by the grid voltage on V11A, which in this case is determined by the voltage divider arrangement composed of a sine potentiometer 74 for the "Target Aspect" control 22 and a linear potentiometer 76 for "Echo Length" control 24. The voltage at the arm of the sine potentiometer 74 will vary between approximately +30 v. and +50 v. as the cosine of the target aspect setting. The arm of the linear potentiometer 76 will determine the average grid voltage for any aspect setting and the percentage of change of voltage around this average.

The positive square wave from this circuit is applied to the control grid of gate tube V12 in echo gate circuit 46 through a limiting and shaping arrangement (the "L-π" network) shown in Fig. 11. The gating pulse and the echo frequency are applied to the same electrode. The "L-π" network in the grid circuit serves to isolate the stages, decrease the rise and decay of the pulse, limit its amplitude, and control the slope of the top. This results in reduced gating thump, a gate amplitude equal to the peak-to-peak voltage of the maximum amplitude of echo input, and an accentuated top slope to compensate for low frequency discrimination in succeeding R-C coupled stages.

The V12 tube is ordinarily cut off until application of the gate pulse. This pulse allows the tube to conduct and amplify the echo signal on the control grid. The resulting plate voltage output is shown in Fig. 11, where $t_1$ represents target-range time. It is possible to use the suppressor grid to gate the tube for target bearing if desired. The tube voltages are taken from a voltage divider arrangement 77 to provide recommended operating conditions.

The source of echo frequency is shown in Fig. 12. This oscillator 47 is a stage with a positive-feedback loop, a tuned negative-feedback loop, and a variable resistance amplitude stabilizing circuit. The positive-feedback loop is made by the connection from the plate of V13B to the grid of V13A through the 0.25 capacitor 78 and 2H choke 79, and by the common cathode conductance between these tubes offered by a small 6 watt tungsten lamp 81. The negative feedback loop is from the plate of V13B through the bridged-T L-R network composed of tubes V14A and V13B as the resistance and chokes VIC-21 with VIC-10 as the inductance, and condenser 82 to the grid of V13B. This network has a transmission null at the oscillating frequency since maximum positive feedback, and proper phase shift occurs then. The null frequency is in turn determined by the D.C. bias on V14A and V14B which affects the dynamic plate resistance of the tubes. Amplitude stability over the tuning range is accomplished by the relatively slow variations with average conduction current of the resistance of the tungsten lamp 81 connecting the cathodes of V13A and V13B. Stability is also provided by limiting the positive feedback at high frequencies by an inductance inserted in the feedback lead. This inductance also slightly improves the low frequency oscillations since it approaches series resonance with the coupling capacitor 78 at the low frequency limit.

The useful frequency range of this oscillator is from approximately 300 c.p.s. to 1300 c.p.s. although it will oscillate well at higher frequencies. The frequency-vs.-control voltage relationship is very nearly logarithmic, although it may be considered linear for a small region near the center frequency of 800 c.p.s. where accurate Doppler determination is necessary. The output, as observed with an oscilloscope, is very nearly a pure sine wave of approximately 10 volts R.M.S. amplitude. Some harmonic content is assured, however, since the bridged-T feedback loop of the oscillator is not as selective to "off frequencies" as good L-C tuned tanks. The oscillating tubes V13A and V13B are slightly overdriven and operated over a considerably non-linear portion of their characteristic curves at the higher frequencies to give sufficient range to allow adequate positive feedback at the lower frequencies, where the null in the negative feedback loop is less effective.

The output of the oscillator is coupled to, and amplified by, the triode V10A.

This stage acts as a buffer for the oscillator and is designed to handle the large input voltages. The gain of the stage is three. The output is impressed across a potentiometer 83 connected to control 26 in Fig. 2 used to control the "Echo Amplitude" with respect to the average volume of the reverberations.

The control-bias voltage for the oscillator 47 is taken from a Doppler computer circuit 48, Fig. 13, which is an arrangement of fixed and adjustable resistors between the negative supply voltage and ground. This circuit is used to provide an output voltage, above and below a given average set for zero Doppler. This voltage excursion is proportional to the product of the cosine of the target aspect times the speed of the target. From Fig. 13 it can be seen that with the "Target Speed" potentiometer 84 set at zero, the output voltage will be nearly constant independent of the setting of the "Target Aspect" sine pot. 85. This average voltage coincides to zero Doppler and may be controlled by the zero-Doppler set 86 used to adjust for different control tubes and for drift in tube characteristics with aging.

The sine potentiometer 85 is ganged with the sine potentiometer 74 of the echo-length circuit 45 and is connected so the voltage at its control arm will change as the cosine of the target aspect, within preset voltage limits. As the "Target Speed" control 23 (Fig. 2) is increased, the output voltage will vary more and more about the average zero-Doppler voltage. There is some interaction between the setting of the sine potentiometer 85 and the impedance presented across a—b due to the conductive coupling between the sine potentiometer 85 and the "Target Speed pot. 84. This does not introduce appreciable error in the function of the output voltage with the controls, but does prohibit an effect of absolute zero target speed unless the "Target Aspect" is set at 90° or 270°. Isolation of these control potentiometers by a vacuum tube would eliminate this questionable disadvantage at the expense of the extra components with increased filament and supply current drain.

The circuit diagram of the +250 volt regulated supply is characterized by the conventional degenerativeregulator circuitry plus the use of all miniature tubes except for the rectifier, by the elimination of a filtering choke, and by its good regulation range to well over the load current drain of 70 ma. with input line voltages of from 105 volts to 130 volts. The ripple voltage is less than 3 mv. at full load; and 40 mfd. across the output terminals provides a very low supply impedance for sudden pulse loads on the supply. The input A.C. for the −150 volt supply is from one side of the center-tapped secondary of a power transformer. Since the current drain on this supply is low, approximately 15 ma., a half-wave arrangement is used. Selenium rectifier units are used for rectification, three being connected in series because of the high back voltage. The output voltage is regulated by a gaseous glow tube, and the output is bypassed by a 2 mfd., capacitor to provide better regulation for sudden load pulses. Since the +250 volt and −150 volt supply do not contain inventive concepts but may be constructed from the above description by one skilled in the art, no drawings of these circuits have been included in this disclosure.

Obviously many modifications and variations of the present invention are possible in the light of the above teachings. It is therefore to be understood that within the scope of the appended claims the invention may be practiced otherwise than as specifically described.

What is claimed is:

1. A random noise generator comprising a thyratron having at least a plate, cathode, and heater element, a cathode current limiting resistor for said thyratron, a source of power for said thyratron having sufficient voltage to render the thyratron conducting thereacross in series with said resistor, means for operating said heater element at reduced filament voltage sufficient to increase the low frequency components of noise due to spurious emission and ionic collision within the gaseous atmosphere of the thyratron, a pentode amplifier coupled to said current limiting cathode resistor, circuit means for operating the screen and plate voltages of said pentode at reduced values such that the amplification factor and the plate resistance have materially increased with a corresponding decrease in mutual conductance, whereby increased stage gain is accomplished for said low frequency noise components of small amplitude voltage while the unwanted higher "hiss" frequencies are substantially discriminated against.

2. A circuit for simulating the time varied gain and time distance decay effects of long sonar pulses, comprising, in combination, a source of reverberation signals, a pentode amplifier for amplifying these signals, a short time constant RC circuit connecting the grid of said amplifier to ground, a second RC circuit connecting said grid to ground and including a condenser having a capacitance many times larger than the condenser in said first named RC circuit, both said condensers being connected to ground on one side thereof, a source of negative potential, a potentiometer interconnecting said source of negative potential and said last named condenser on the other side thereof, normally open switch means controllable by keying means simulating that of sonar equipment for shorting said last named condenser during the keying time whereby the gain of the pentode is rapidly increased to maximum and the sudden high level output thereof is subdued at keying time thereby simulating said time-varied gain effect, said gain of the pentode being gradually decreased to a value approaching said negative potential source when said switch means opens at the termination of said keying time thereby simulating said time-distance decay effect, said potentiometer being adjustable to set the rate of said decay.

3. A circuit for simulating the time-varied gain and time-distance decay effects for short sonar pulses comprising, in combination, a source of random noise pulses covering a predetermined band of frequencies, a pentode for amplifying said random noise pulses, an RC circuit connecting the grid of said pentode to ground potential, a second RC circuit connecting said grid to ground potential and including a condenser having a capacitance many times the value of the condenser in said first named RC circuit, a source of negative potential, a voltage divider network connecting said source of negative potential to ground potential, switch means controllable by keying means simulating that of sonar equipment for producing said short sonar pulses, said switch means being normally open and connected on one side to said condenser in the second RC circuit and on the other side to a high negative potential point in said voltage divided network, a resistor connecting a low negative potential point in said voltage divider network and said condenser in the second RC circuit, said last named condenser being connected through said switch means to said high negative potential point as said switch means closes thereby to bias the pentode to cutoff and reduce the output thereof to zero during the closed time of said switch means, said pentode gain being rapidly increased to a value controlled by said low negative potential point in said network as said switch means opens at the end of the transmit key time.

4. A circuit for simulating the audible time varied gain and time distance effects of long and short sonar pulses comprising, in combination, a source of random noise having amplitude variations at a single frequency and including means for converting said single frequency amplitude variations to amplitude variations over a predetermined band of frequencies, a pentode amplifier connected to said source of random noise, first, second, and third RC circuits connecting the grid of said amplifier to ground potential, the condenser of said first RC circuit having a small capacitance, the condenser of the third RC circuit having a capacitance many times larger than the capacitance of said first condenser, the condenser of said second RC circuit having a capacitance many times larger than the capacitance of the condenser in said third RC circuit, said condensers being connected on one side to ground potential, a source of negative voltage, a potentiometer connecting said negative voltage source to the other side of the condenser of the second RC circuit, a voltage divider network interconnecting said negative voltage source and ground potential, a resistor connecting the other side of the condenser of the third RC circuit to a point of low negative potential in said voltage divider network, a pair of normally open contacts, said contacts being actuable by keying means simulating that of sonar equipment for producing said long and short pulses, said contacts being closed during the keying time of said sonar equipment, a three pole double throw switch operable when set in one of the positions thereof to connect the other side of the condenser of said second RC circuit to ground potential whereby the gain of said pentode amplifier is rapidly increased to maximum through said first RC circuit and subdues the sudden high level output of signals received from said random noise source during said key time of the sonar equipment thereby simulating the audible time-varied gain effect for long pulses, said condenser of the second RC circuit gradually charging through said potentiometer from said source of negative potential to a value approaching the voltage of said negative source following opening of said contacts thereby gradually decreasing the gain of the amplifier exponentially and thus simulating said time-distance decay effect for a long pulse, said three pole double throw switch being operable in the other of said positions to render said converting means of the random noise source effective to supply amplitude variations over the band of frequencies to the amplifier and to connect said contacts between the other side of the condenser of the third RC circuit and a high negative potential point in said voltage divider network whereby said last named condenser charges to the potential of said high negative potential point thereby reducing the output of said amplifier to zero during the closed time of said contacts, said last named condenser discharging to the voltage at said low potential point in said voltage divider network following opening of said contacts thereby exponentially returning the grid potential of said amplifier in a short time to the voltage of said low negative potential point and thus simulating the reverberation effects resulting from a short sonar pulse.

5. A cathode coupled sweep circuit of the character disclosed comprising, in combination, a source of positive voltage, a source of negative voltage, a first voltage divider network interconnecting said source of positive voltage and ground, a second voltage divider network interconnecting said source of negative voltage and ground, a cathode follower circuit including a triode having the plate thereof connected to said positive voltage source, a cathode load resistor interconnecting the cathode of said triode and said negative potential source, a condenser interconnecting the grid of said triode and an intermediate negative potential point in said second voltage divider network, a resistor interconnecting an intermediate potential point in said first voltage divider network and said grid, a clamping diode interconnecting said grid and a low negative potential point on said second voltage divider network, a pair of normally open contacts connected across said condenser for discharging said condenser as the contacts close whereby the potential of said grid is reduced negatively to said intermediate negative potential point on said second voltage divider network and the output signal across said cathode load resistor is reduced to zero, said condenser being charged through said resistor from said positive potential source at a linear rate when said contacts have been opened thereby to generate a linear voltage sweep, said clamping diode limiting the amplitude of said sweep voltage.

6. A flyback circuit of the character disclosed comprising, in combination, a multivibrator comprising a pair of normally non-conducting and conducting tubes, a relay connected in the plate circuit of the normally non-conducting tube for operating a pair of normally open contacts, a source of linear sweep voltage connected to the grid of said normally non-conducting tube and having means controlled by said pair of contacts for terminating the linear rise of said sweep voltage as the relay operates, a potentiometer included in the grid to cathode circuit of the normally conducting tube for controlling the flyback rate of said multivibrator, the rise in potential at the plate of the said normally conducting tube during contact time of said contacts providing an output pulse.

7. The circuit of claim 6 further characterized by the provision of a second source of pulses for connection to the grid of the normally non-conducting tube of said multivibrator, and automatic-remote keying switch means for transferring said multivibrator between said second source of pulses and said source of sweep voltage.

8. A circuit for simulating an echo pulse at a predetermined target range comprising, in combination, a multivibrator comprising a pair of triodes having a common cathode load resistor, a source of positive potential, one of said triodes having the plate thereof connected directly to said source of positive potential, a resistor interconnecting said source of positive potential and the plate of the other of said triodes, a voltage divider network interconnecting the positive potential source and said common cathode load resistor, said voltage divider network including a potentiometer having a wiper connected to the grid of the said first mentioned triode whereby said triode is rendered normally non-conducting from said positive potential source, means for connecting said grid to a source of pulses simulating the transmitted pulse of a sonar equipment and having a predetermined pulse recurrence rate, said pulses operating to render said first named triode conducting as the pulses are applied to said grid, said other triode being normally conducting, said first triode being connected as a cathode follower whereby the voltage of said pulses appears across said common cathode and renders said other triode non-conducting, a sweep voltage source connected to the grid of said other triode, said sweep voltage increasing linearly from zero value at the termination of each of said pulses whereby a potential is developed on the grid of said other triode sufficient to overcome the bias across said common cathode load resistor to render said other triode again conducting after a period of time corresponding to said target range, and a buffer amplifier connected to the plate of said other triode for generating a sharp pulse in the output thereof each time said other triode is rendered again conducting thereby to simulate an echo pulse at the target range.

9. A circuit for adjusting the width of a simulated echo pulse for target aspect and pulse length comprising, in combination, a multivibrator comprising a pair of triodes having a common cathode connected to ground potential, a source of positive potential, a pair of load resistors respectively connecting the plates of said triode to said source of potential, a voltage divider network interconnecting said source of potential and ground, said voltage divider network including a sine potentiometer the voltage at the arm of which varies approximately as the cosine of the target aspect setting, said voltage divider network also including a linear potentiometer having the wiper thereof connected to the grid of the normally non-conducting triode of said multivibrator, said linear potentiometer being connected between said arm of the sine potentiometer and a low voltage potential point in said voltage divider network, a condenser and a resistor connected in series between the plate of said normally non-conducting triode and said positive potential source in the order named, the grid of said second triode being connected to the junction of said condenser and resistor, and a source of said simulated echo pulses connected to the grid of said normally non-conducting triode for rendering the same conducting to develop across said common cathode load resistor a voltage proportional to the voltage of said echo pulse, said last named voltage rendering said second triode non-conducting, said series connected condenser and resistor being operable as said normally non-conducting triode conducts to gradually overcome the said bias across said cathode load resistor and elevate the potential on the grid of said second triode to a voltage rendering the same again conducting after a predetermined period of time thereby producing a square wave pulse at the output of the said second triode having a pulse width corresponding to a target aspect setting and an echo length determined by the setting of said sine potentiometer and said linear potentiometer respectively.

10. A Doppler oscillator of the character disclosed comprising, in combination, a pair of triodes, a source of positive potential, one of said triodes having its plate connected to said potential source, a resistor interconnecting the plate of the other of said triodes to said potential source, non-linear resistance means interconnecting the cathodes of said triodes, a positive feedback loop interconnecting the plate of said other of the triodes and the control grid of said one of the triodes, said feedback loop comprising a condenser in series with a choke, a negative feedback loop interconnecting the plate of said other triode and the grid thereof, said negative feedback loop comprising a bridged-T L-R network, said network comprising a pair of chokes and a second pair of triodes, one of said chokes being interconnected between ground and the cathodes of said last named triodes, the other of said chokes being connected between the plates of said second pair of triodes, a condenser interconnecting one of said last mentioned plates with the grid of said other of the triodes, the other of said last mentioned plates being connected to the plate of said other of the triodes, a source of bias voltage for said second pair of triodes to control the frequency of oscillation of said other of the triodes, an amplifier coupled to the plate of said other of the triodes and having means in the output circuit thereof for adjusting the amplitude of the generated oscillations at the frequency determined by said bias voltage.

11. A circuit for developing a signal which simulates the target aspect and target speed effects of an echo pulse comprising, in combination, a source of negative potential, a voltage divider network connected between said source of negative potential and ground, said voltage divider network including a sine potentiometer having an arm whose voltage varies as the cosine of the target aspect, a pair of resistors of equal value connected in series across said sine potentiometer, a linear potentiometer interconnected between said arm and the junction of said last namer resistors, the setting of the wiper of said linear potentiometer providing a measure of target speed whereby the voltage on the wiper provides a measure of target aspect and target speed.

12. Apparatus for providing an audible presentation of simulated initial pulse, reverberation, and echo pulse signals from a predetermined target range, comprising, in combination, a speaker, a random noise channel connected to said speaker, an echo pulse channel connected to said speaker, keying means in said echo pulse channel for generating reset pulses which recur at a predetermined rate, means for widening one of said reset pulses in an amount corresponding to a predetermined target range time, means in said random noise channel controlled by said keying means for rapidly increasing the amplitude of the random noise therein during the interval of said reset pulses thereby to simulate the time-varied-gain of a high suppressed initial pulse for long pulse sonar operation, a second means in said random noise channel effective at the termination of said interval for causing exponential decay of the amplified noise thereby to simulate the time-distance decay effect of long pulse sonar, said echo pulse being audibly presented during the period of said decaying noise.

13. Apparatus for providing an audible presentation of simulated sonar initial pulse, reverberation, and echo pulse signals from a predetermined target range comprising, in combination, a speaker, a random noise channel and an echo pulse channel connected to said speaker, keying means in said echo pulse channel for generating reset pulses which recur at a predetermined rate, means for widening one of said reset pulses in an amount corresponding to a predetermined target range time, means in said random noise channel and controllable by said keying means for reducing the random noise in said noise channel to zero during the interval of said reset pulses and for causing the random noise to increase rapidly from zero value to a constant value within a short interval following each of said reset pulses thereby to simulate the reverberation effect corresponding to those resulting from high power short pulse sonar operation, said random noise continuing substantially at said constant value for an interval which continues until the time of the next succeeding reset pulse, said echo pulse occurring during said last named continued interval.

14. Apparatus for providing an audible presentation of the simulated sonar initial pulse and reverberation signals comprising, in combination, a speaker, a random noise channel connected to said speaker, normally open contact means having a dwell or close time simulating the key time of a sonar equipment, switch means in said random noise channel having a long pulse position and a short pulse position, means in said random noise channel controlled by said contact means for rapidly increasing the gain of the random noise during said key time when said switch means is in the long pulse position thereof thereby to simulate the time-varied-gain effect of a high suppressed initial pulse, means in said random noise channel and effective at the termination of said keying time for causing an exponential decay of said amplified noise when said channel switch means is in said long pulse position thereof thereby to simulate the time-distance decay effect of long sonar pulses, means in said noise channel and controlled by said contact means for reducing the amplitude of the noise to zero during said key time and for exponentially increasing said reduced noise to a constant value following the termination of said key time when the channel switch means is in the short pulse position thereof thereby to simulate the reverberation effects resulting from short sonar pulses, said noise in said channel being at a single frequency when said channel switch means in the long pulse position thereof and said noise including a range of frequencies when said channel switch means in the short pulse position thereof.

15. Apparatus of the character disclosed for generating an echo trigger pulse comprising, in combination, means for generating pulses having a predetermined repetition rate, means for widening said pulses in an amount corresponding to a predetermined simulated target range time, including a multivibrator comprising a pair of triodes having a common cathode load resistor, the first triode being connected as a cathode follower, the second triode being normally conducting, means whereby a potential developed on the grid of said second triode sufficient to overcome the bias across said common cathode load resistor renders said second triode conducting after a period of time corresponding to said target range time, and means comprising a buffer amplifier connected to the plate of said second triode for generating a sharp pulse in the output thereof each time said second triode is rendered again conducting, the output of said buffer amplifier being connected to a capacitor and a clipping arrangement of germanium diodes for generating said trigger pulse at the termination of said widened pulses.

16. Apparatus of the character disclosed for generating a trigger echo pulse comprising, in combination, means for generating a sweep voltage which increases at a linear rate, a multivibrator connected to said generating means connected and arranged to be triggered thereby when said sweep voltage increases to a predetermined value, said multivibrator having adjustable means for predetermining said value, means controlled by said multivibrator and effective as the same is triggered for reducing said sweep voltage to zero, means for restoring said multivibrator to its initial untriggered condition a predetermined interval after said sweep voltage is reduced to zero, said multivibrator providing an output pulse having a width corresponding to said trigger interval of the multivibrator, a second multivibrator comprising a pair of triode tubes having the grid of one of the tubes connected to said output of the first named multivibrator whereby said pulse output therefrom is applied to said grid, the grid of the other of the tubes being connected to said sweep voltage generating means whereby said sweep voltage is applied thereto, means for applying a bias voltage to said first named grid in an amount corresponding to a predetermined echo range, the other of the tubes being biased by a voltage proportional to said bias voltage as the second multivibrator is triggered, said output pulse from the first multivibrator triggering said second multivibrator, said second multivibrator being restored to its initial untriggered condition when said sweep voltage on the grid of the other of the tubes has increased to a value sufficient to overcome the bias effect introduced during said trigger action whereby said other of the triodes is rendered conducting and said output pulse is effectively widened at the output of said second multivibrator in an amount corresponding to said predetermined target echo range, and means coupled to said second multivibrator and responsive to said widened impulse for generating said trigger echo pulse at the termination of the widened pulse.

17. Apparatus for generating a simulated echo pulse from a predetermined target range and having a frequency determined by target aspect and target speed and having a width determined by target aspect and pulse length comprising, in combination, means for generating reset pulses which recur at a predetermined rate, means for widening one of said reset pulses in an amount corresponding to a predetermined target range, means for generating an echo trigger at the termination of said widened reset pulse, resistance means adjustable in an amount corresponding to a predetermined target aspect and a predetermined pulse length, means for widening said echo trigger pulse in an amount corresponding to the adjustment of said resistance means, second resistance means adjustable in an amount corresponding to a predetermined target speed and said predetermined target aspect, a Doppler oscillator for generating a frequency in accordance with the adjustment of said second resistance means, a normally closed echo gate controlled by said widened trigger pulse for receiving and passing said Doppler frequency during a period corresponding to the width of said widened echo trigger pulse.

References Cited in the file of this patent
UNITED STATES PATENTS

| | | |
|---|---|---|
| 2,445,712 | Forbes | July 20, 1948 |
| 2,517,591 | Nightenhelser | Aug. 8, 1950 |
| 2,522,541 | Saxton et al. | Sept. 19, 1950 |
| 2,524,847 | Springer | Oct. 10, 1950 |
| 2,529,468 | Dehmel | Nov. 7, 1950 |
| 2,548,684 | Roth | Apr. 10, 1951 |
| 2,605,556 | Jones | Aug. 5, 1952 |
| 2,713,729 | Springer | July 26, 1955 |